(12) United States Patent
Allen et al.

(10) Patent No.: US 11,293,580 B2
(45) Date of Patent: Apr. 5, 2022

(54) PIPELINE SPHERE WITH TRACKING DEVICE

(71) Applicant: S&B Technical Products, Inc., Fort Worth, TX (US)

(72) Inventors: Charles Allen, Houston, TX (US); Pamela Murrin, Fort Worth, TX (US)

(73) Assignee: S&B Technical Products, Inc., Fort Worth, TX (US)

( * ) Notice: Subject to any disclaimer, the term of this patent is extended or adjusted under 35 U.S.C. 154(b) by 250 days.

(21) Appl. No.: 16/778,750

(22) Filed: Jan. 31, 2020

(65) Prior Publication Data

US 2020/0256500 A1   Aug. 13, 2020

Related U.S. Application Data

(60) Provisional application No. 62/803,850, filed on Feb. 11, 2019.

(51) Int. Cl.
*F16L 55/28* (2006.01)
*F16L 55/48* (2006.01)
(Continued)

(52) U.S. Cl.
CPC ............ *F16L 55/28* (2013.01); *B08B 9/0552* (2013.01); *F16L 55/40* (2013.01); *F16L 55/44* (2013.01);
(Continued)

(58) Field of Classification Search
CPC . F16L 55/28; F16L 55/40; F16L 55/44; F16L 55/48; F16L 2101/12;
(Continued)

(56) References Cited

U.S. PATENT DOCUMENTS 2,810,143 A * 10/1957 Reynolds .............. B08B 9/0552
                                                          15/104.061
3,011,197 A * 12/1961 Nehse ................... B08B 9/0552
                                                          15/104.061
(Continued)

FOREIGN PATENT DOCUMENTS

WO         200176780 A1     3/2001

OTHER PUBLICATIONS

PCT/US20/16713, International Search Report, dated May 5, 2020, 1 page.

(Continued)

*Primary Examiner* — Randall E Chin
(74) *Attorney, Agent, or Firm* — Whitaker Chalk Swindle & Schwartz PLLC; Charles D. Gunter, Jr.

(57) ABSTRACT

A pipeline sphere is shown which houses an electronics package. The sphere is formed as a hollow elastomeric body having a predetermined wall thickness and an initially void interior. A carrier tube is positioned within the initially void interior of the sphere and is supported by oppositely arranged carrier plates which are themselves embedded within oppositely arranged end openings of the sphere. A removable inflation valve is contained in one of the valve plates at a first end of the carrier tube. The carrier tube has a plurality of apertures formed through its wall to enable inflating or deflating the sphere. One electronics package that can be used is an electrical tracking device.

4 Claims, 4 Drawing Sheets

(51) Int. Cl.
*F16L 55/40* (2006.01)
*F16L 55/44* (2006.01)
*B08B 9/055* (2006.01)
*F16L 101/12* (2006.01)
*F16L 101/70* (2006.01)

(52) U.S. Cl.
CPC ........... *F16L 55/48* (2013.01); *F16L 2101/12* (2013.01); *F16L 2101/70* (2013.01)

(58) Field of Classification Search
CPC   F16L 2101/30; F16L 2101/70; B08B 9/0552; B29D 22/02; B29D 22/04
See application file for complete search history.

(56) References Cited

U.S. PATENT DOCUMENTS

| | | | |
|---|---|---|---|
| 3,074,436 A * | 1/1963 | En Dean | B08B 9/0552 137/802 |
| 3,343,561 A | 9/1967 | Bowerman | |
| 4,079,619 A | 3/1978 | Dobesh | |
| 4,491,018 A | 1/1985 | Stringer et al. | |
| 4,767,603 A | 8/1988 | Byrd et al. | |
| 5,461,354 A | 10/1995 | Rosenberg et al. | |
| 8,894,772 B2 | 11/2014 | Phipps et al. | |
| 10,036,680 B2 | 7/2018 | Frueh | |
| 11,047,759 B2 * | 6/2021 | van Pol | G01L 19/0092 |
| 2003/0121338 A1 * | 7/2003 | Yates | B08B 9/053 73/865.8 |
| 2004/0231701 A1 | 11/2004 | Young | |
| 2008/0204008 A1 | 8/2008 | Paulson | |
| 2012/0006420 A1 | 1/2012 | Cooper et al. | |
| 2018/0149301 A1 | 5/2018 | Aslam | |

OTHER PUBLICATIONS

Maloney Technical Products Brochure, "Maloney Pipeline & Power Spheres", Aug. 9, 2017 (Wayback Machine), 2 pages www.maloneytech.com.

* cited by examiner

PIPELINE SPHERE WITH TRACKING DEVICE

CROSS REFERENCE TO RELATED APPLICATION

The present application claims priority to U.S. Provisional Patent Application Ser. No. 62/803,850, filed Feb. 11, 2019, by the same inventors and with the same title.

BACKGROUND OF THE INVENTION

1. Field of the Invention

The present invention generally relates to devices used in oil and gas pipeline operations, and more particularly to improvements in the so-called pigs that are employed in maintenance operations within the pipeline structures such as flow assurance, cleaning, inspecting, etc.

2. Background of the Invention

Many types of devices are pumped down oil and gas pipelines in order to be used for functions such as cleaning, batch separation, condensate removal and other needs. Certain of these devices, called "pigs," may, in general, be constructed of steel or foam bodies, typically configured as either cylindrical or spherical bodies.

Spherical pigs offer a number of advantages. For example, it is possible for a spherical shaped pig to: (A) travel through irregular or round pipe more easily while retaining contact with the inside diameter of the pipeline; (B) pass through tighter radius bends in the pipeline; and (C) launch into the pipeline in an automated process from a launcher disposed on an incline, wherein a series of detent pins enable release of the sphere into the flow stream of the pipeline at desired intervals. Pigs of this type are also typically provided with a liquid filled bladder In the past, both steel and foam body pigs have been fitted with tracking devices ranging from simple magnets to electronic packages of various configurations and capabilities. Such devices could generally be installed prior to using the device in the pipeline and retrieved when the purpose of having the tracking device was completed. Heretofore, it has not been possible to accomplish these purposes with a spherical pig because of prior limitations in the design and manufacturing processes related to removably supporting a tracking device or instrument package within an inflatable spherical device while maintaining the necessary sealing characteristics of the spherical design.

Accordingly, there is a need for an improved design of a spherical pipeline pig that overcomes the limitations in the conventional designs.

SUMMARY OF THE INVENTION

It is an object of the invention to provide a pipeline sphere that incorporates a tracking device or other electronic package within the sphere.

It is further an object of the invention to provide a valve design in a spherical pig that is large enough to allow passage of a tracking device into the interior of the sphere, yet small enough to maintain an effective seal by the sphere against the inside diameter of the pipe while it traverses the pipeline.

It is further an object of the invention to capture and support a tracking device within a sleeve or cage inside the sphere as it is filled with fluid and expanded to conform to different wall thicknesses of the pipeline pipe.

It is further an object of the invention to permit change-over of a tracking device assembly under field conditions with only minimum training and minimum special equipment.

In one embodiment a pipeline sphere is provided with a tracking device, comprising a hollow elastomeric sphere having a predetermined wall thickness; a carrier tube embedded along a first diameter of the sphere; a tracking device disposed within the carrier tube between first and second valve plates aligned along the first diameter of the sphere; and at least one removable inflation valve supported in a first valve plate disposed at a first end of the carrier tube.

In one aspect, the elastomeric sphere comprises an assembly of first and second hemispherical shells molded of an elastomeric material selected from the group consisting of natural and synthetic elastomers including neoprene rubber, nitrile rubber and other suitable synthetic polymeric materials such as polyurethane.

In another aspect, a tracking device comprises a locator instrument sealed within the carrier tube, wherein the locator instrument may comprise a device selected from the group consisting of a magnet, an inertial tracker, a data acquisition device, and a sensor for detecting temperature, pressure and chemical composition of pipeline or well substances.

In another aspect, the carrier tube comprises an elongated tube formed as a cylinder having a thin wall and disposed along the first diameter of the sphere, and a removable cap to enable access to the tracking device; wherein the elongated tube has a plurality of apertures formed through the thin wall to enable inflating or deflating the sphere and to equalize pressures on either side of the thin wall, thereby providing a stable hydraulic environment within the sphere.

In other aspects, the first and second valve plates are disposed in the wall of the sphere along and coupled to opposite ends of the carrier tube; and the removable inflation valve comprises a Schrader-type air/fluid control valve having a removable check valve core to seal back flow.

DETAILED DESCRIPTION OF THE INVENTION

Figure 1:
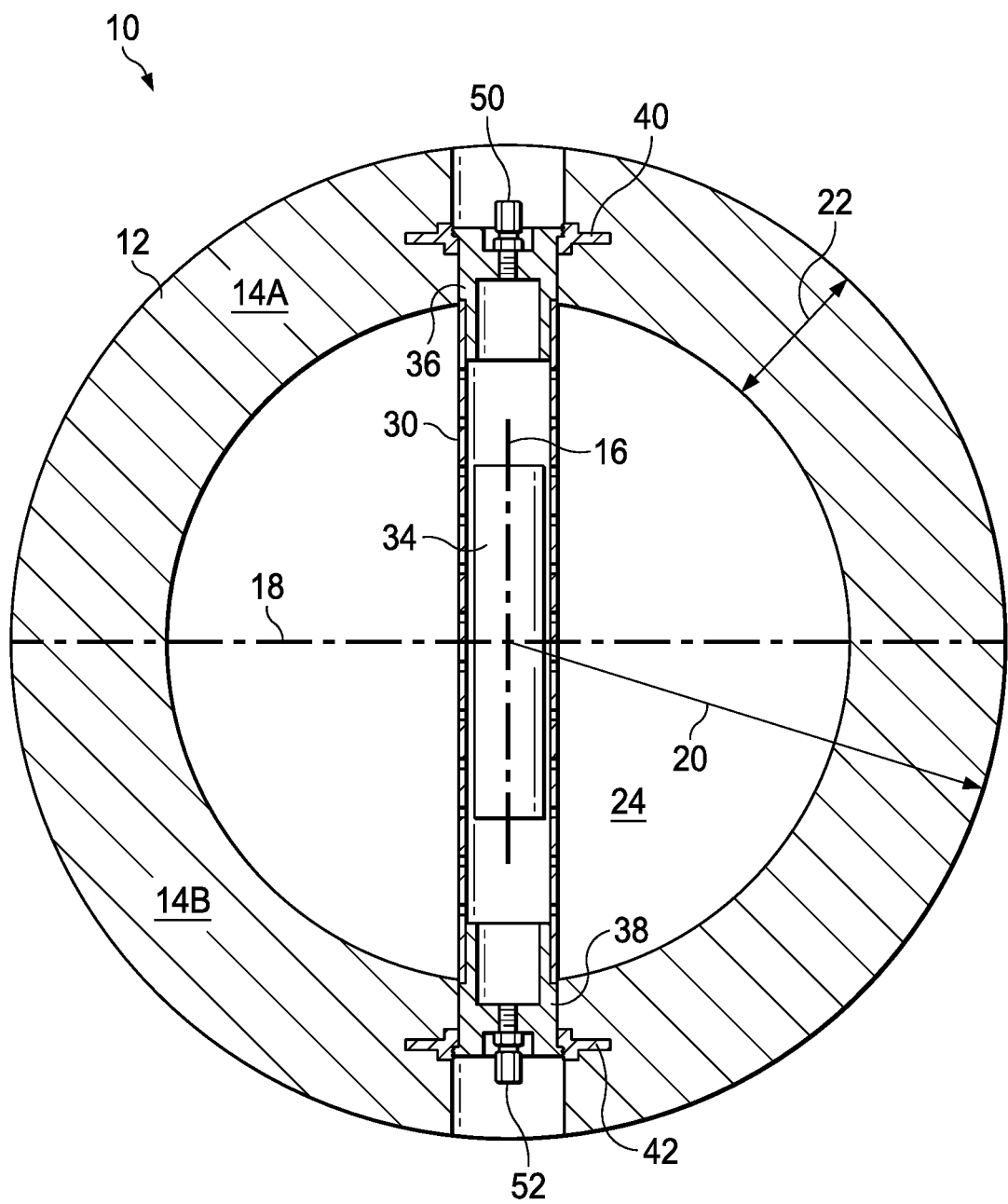
FIG. 1 illustrates a cross section diagram of a pipeline sphere in accordance with an embodiment of the claimed invention.

In an advance in the state of the art, a pipeline sphere with a built-in tracking device is disclosed comprising a hollow elastomeric sphere having a predetermined wall thickness that is less than the radius of the sphere. In one embodiment a carrier tube is embedded within the sphere and disposed along a first diameter of the sphere. An electronics package, such as an electronic tracking device, is disposed within the carrier tube between first and second valve plates aligned along the first diameter of the sphere, the valve plates being embedded in the wall of the sphere near each end of the first diameter of the sphere. Further, at least one removable inflation valve or valve body is supported in a first valve plate disposed at a first end of the carrier tube.

The inflation valve or valve body is used to inflate the sphere for adjusting its overall diameter to conform to the particular size of the pipe which will receive the sphere. In one embodiment, the valve body is a Schrader-type valve that includes a spring-loaded check valve to permit inflation with air or a liquid such as water or a water/ethylene glycol mixture. The valve also permits release of the air or liquid to remove the inflating substance from the sphere.

The tracking device could be any type of sensor or electronic instrument such as a locator instrument sealed within the carrier tube. In other embodiments, the tracking device may be a locator instrument such as a device selected from the group consisting of a magnet, an inertial tracker, a data acquisition device, and a sensor for detecting temperature, pressure and chemical composition of pipeline or well substances.

The carrier tube and the valve body assemblies may be formed of stainless steel or any other suitable material that can withstand the often toxic chemicals encountered within a pipeline. The carrier tube and valve plates are configured to enable removal of the tracking device for service or replacement. The carrier tube may be an elongated tube having a plurality of apertures formed through the thin wall to enable inflating or deflating the sphere and to equalize pressures on either side of the thin wall, thereby providing a stable hydraulic environment within the sphere.

In the illustrated embodiment, the pipeline sphere is molded as hemispherical halves, one of which includes the carrier tube and valve plates embedded within it as the elastomeric material is introduced into the mold cavity. The sphere is then formed by assembling the hemispheres together and bonding the two halves to form a joint around the circumference of the sphere. This can conveniently be accomplished by any conventional rubber bonding technique including the use of an elastomeric material identical or similar to the material used to mold the sphere itself.

Nitrile and neoprene pipeline spheres of the general type under consideration have been manufactured for many years by Maloney Technical Products, Fort Worth, Tex. However, these spheres did not include any type of electrical tracking package. Exemplary dimensions of these commercially available spheres are as follows:

| NITRILE SPHERES NEOPRENE SPHERES | | |
|---|---|---|
| O.D. of Sphere (Inches) | Wall Thickness of Sphere (Inches) | Weight Empty (lbs) |
| 3.90 | 0.750 | 1.26 |
| 5.90 | 1.375 | 4.65 |
| 6.20 | 1.800 | 5.74 |
| 7.90 | 1.625 | 10.25 |
| 8.20 | 1.750 | 12.01 |
| 10.00 | 2.000 | 21.00 |
| 11.90 | 2.000 | 28.83 |
| 13.10 | 2.250 | 40.60 |
| 15.30 | 2.500 | 59.30 |
| 17.30 | 2.500 | 81.70 |
| 19.30 | 3.000 | 128.50 |
| 21.30 | 3.000 | 146.90 |
| 23.30 | 3.000 | 188.50 |
| 25.00 | 3.000 | 233.50 |
| 26.80 | 4.000 | 326.00 |
| 29.00 | 3.500 | 341.00 |
| 31.00 | 3.500 | 382.00 |
| 33.00 | 3.750 | 458.00 |
| 35.00 | 4.000 | 550.00 |
| 39.00 | 4.250 | 788.00 |

These dimensions are not meant to be limiting of the invention, but are merely intended to be representative of the typical dimensions of the prior art hollow spheres without the improved tracking package of the invention.

FIG. 1 illustrates a cross section diagram of a pipeline sphere 10 in accordance with a non-limiting embodiment of the claimed invention. The sphere 12 is assembled from first hemisphere 14A and second hemisphere 14B that may be injection molded from several elastomeric materials such as the previously mentioned neoprene rubber, nitrile rubber, or polyurethane synthetic elastomer. Selection of material is typically governed by the size of the sphere, the temperature range of expected uses, the type of chemicals the sphere may come in contact with, etc. To assist in this description, several parameters of the sphere are defined, including a first diameter 16, a second diameter 18, a radius 20, and a wall thickness 22, and a cavity 24. The cavity 24 may be inflated with air, a liquid such as water, or, in one example, a mixture of water and ethylene glycol in a 50%/50% ratio.

Continuing with FIG. 1, embedded within the sphere 12 along a first diameter 16 may be a carrier tube 30 that is disposed between first 40 and second 42 valve plates, which support respectively a first follower assembly 36 and a second follower assembly 38 removably attached to said carrier tube 30. In this particular embodiment, the follower assemblies 36, 38 have stepped outer diameters which form tapered ends that slide into the ends of the carrier tube 30, forming a fluid-tight seal. In this particular embodiment, each of the valve plates 40, 42 includes a threaded opening into which the first 36 and a second 38 follower assembly may be threadedly installed, respectively, and the follower assemblies 36, 38 have threaded openings into which a first 50 and a second 52 valve body assembly (aka, a Schrader-type valve) may be installed. It should be recognized that there are many variations of how the follower assemblies 36, 38 may be seated in the valve plates 40, 42 and connected to the carrier tube 30, such as with adhesive, quick connectors, etc.

Figure 2:
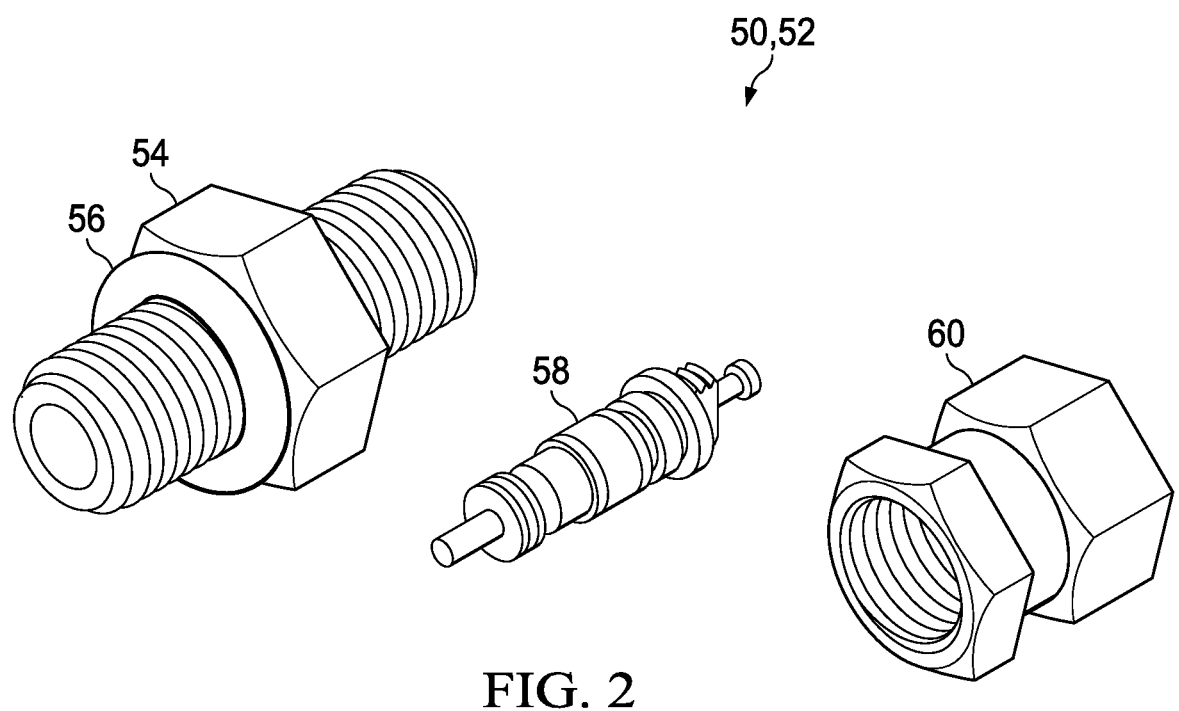
FIG. 2 is an isolated view of the component parts of the control valve assembly shown prior to assembly.

FIG. 2 illustrates a control valve assembly as used with a non-limiting embodiment of the claimed invention. The valve assembly 50, 52 depicted in the figure is a type of Schrader valve. The component parts include a valve body 54, an O-ring seal 56, a valve core 58, and a valve cap 60. Persons of skill in the art will recognize these components as similar to the Schrader valve used in pneumatic tires for inflating and deflating the tires. Persons of skill in the art will also recognize that valves other than Schrader valves may be used, as well.

In one embodiment, the manufacturing sequence to assemble the pipeline sphere 10 proceeds as follows. The metal plates 40,42 are treated with a metal preparation process to provide a surface that will bond to the elastomer material of the sphere. The process may be adapted to the characteristics of the materials in the valve plate and the sphere. The valve plates 40, 42 are placed and secured in the hemisphere mold. The elastomeric material is loaded into the mold, controlled by weight. The mold is closed and held in a hydraulic press under controlled temperature and pressure until vulcanized. The hemispheres 14A, 14B are removed from the mold, allowed to cure, trimmed to remove excess flash, and inspected for defects within and outside the molded hemisphere.

Two of the hemispheres 14A, 14B are bonded together using the same or similar elastomeric material used to mold them, followed by trimming excess flash and a visual inspection for flaws. After cooling, the follower assemblies 36, 38 and valve bodies 50, 52 are installed, and the sphere 12 inflated with water to an oversize diameter. After being held in this condition for at least 24 hours, the sphere 12 is examined for signs of leakage or manufacturing flaws and the quality checklist is completed, followed by attaching the identification label to the sphere 12.

Figure 3:
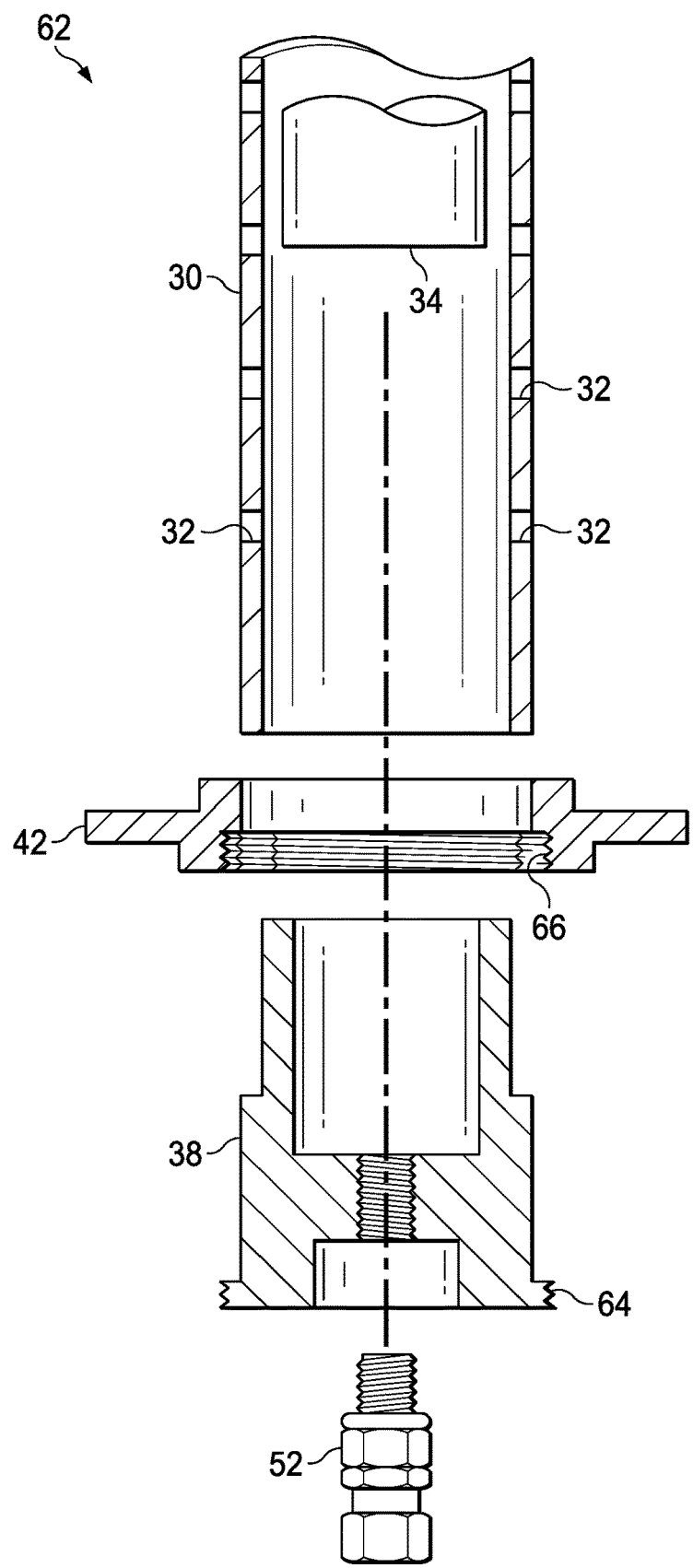
FIG. 3 illustrates an isolated, expanded view of the carrier tube assembly of the invention.

FIG. 3 depicts examples of the components of the carrier tube, valve plates and follower assembly on one end of the overall assembly 62 (i.e. carrier tube 30, valve plate 42, follower assembly 38, valve body assembly 52) with the electronics package 34 (shown in simplified fashion) disposed within. In this embodiment, the carrier tube 30 has a plurality of apertures 32 along its length that allow for an equalization of pressure on either side of the carrier tube 30 wall. The follower assembly 38 can be inserted through the valve plate 42 and into the carrier tube 30, where it forms a friction fit, thereby creating a seal therebetween. The follower assembly is secured within the valve plates opening as by mating threaded surfaces on the respective mating parts, the follower assembly threads labeled as 64 and the corresponding valve plate threads labeled as 66. The valve body assembly 52 is subsequently installed on the follower assembly 38. In use, a valve body assembly 52 may be opened to allow the injection of fluid through the follower assembly 38 and into the carrier tube 30, and such fluid equalizes in pressure across the carrier tube 30 walls via the plurality of apertures 32 along the carrier tube 30 length.

Figure 4:
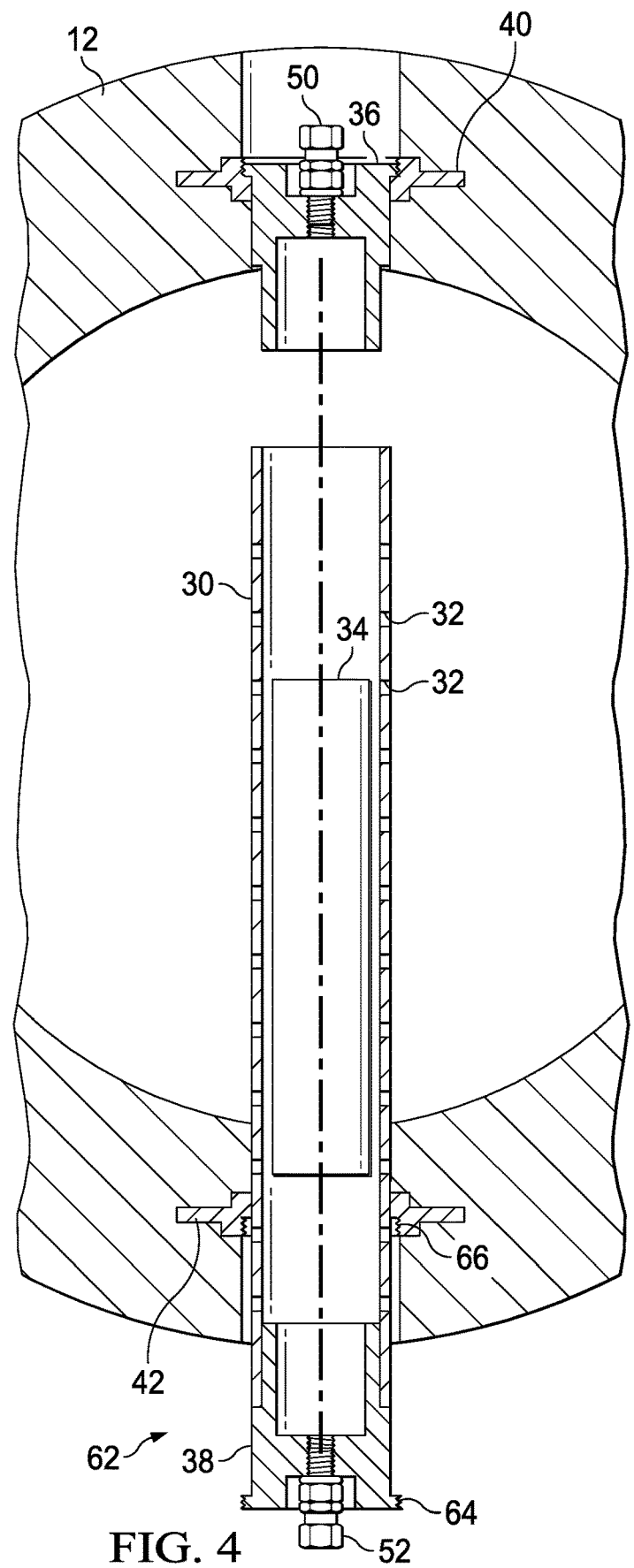
FIG. 4 is a partial, sectional view of a pipeline sphere of the invention showing how the carrier tube assembly is installed in the pipeline sphere.

FIG. 4 depicts an embodiment wherein the carrier tube system 62 is installed into a pipeline sphere 10. In this embodiment, the sphere 10 is fabricated as described above with the valve plates 40,42 already disposed within the two hemispheres. To install the rest of the tube system 62, one follower assembly 36 is inserted into a valve plate 40, with a valve body assembly 50 subsequently installed within the follower assembly 36. The carrier tube 30 and contained electronics package 34 may then be inserted through the empty valve plate 42 and seated on the pre-installed follower assembly 36, and the other follower assembly 38 may subsequently be inserted behind the carrier tube 30 and installed within the valve plate 42 by engaging the follower assembly threads 64 with valve plate threads 66, securing the other end of the carrier tube 30 within the pipeline sphere 10. The other valve body assembly 52 may then be installed on the last-installed follower assembly 38, and either valve body assembly 50, 52 may be used to inflate the pipeline sphere with a desired fluid.

While the invention has been illustrated and described in only one of its forms, it is not thus limited but is susceptible to various changes and modifications without departing from the concepts underlying the exemplary embodiment. For example, variations in the structure of the carrier tube, the valve plates, the valve bodies, etc., or even of the sphere itself are possible while remaining within the scope of the appended claims that follow.

What is claimed is:

1. A method of manufacturing a pipeline sphere with electronic tracking capabilities, wherein the method comprises the steps of:
   securing a valve plate in a hemisphere mold;
   loading an elastomeric material into said mold;
   vulcanizing the elastomeric material within the mold to form a first hemisphere with the valve plate embedded therein at a first end opening formed at one location in the first hemisphere;
   removing the first hemisphere from the mold and allowing said first hemisphere to cure;
   bonding the first hemisphere to a second identically formed hemisphere to form a sphere, wherein the second hemisphere is made of the same elastomeric material as the first hemisphere and is also provided with an identical valve plate located in an end opening thereof;
   installing a perforated carrier tube and contained electronics package into said sphere, through a selected one of the sphere end openings, wherein said carrier tube and contained electronics package is secured within the sphere via a pair of follower assemblies attached to said valve plates; and
   installing at least one valve body assembly within a selected follower assembly.

2. The method of claim 1, wherein the wall thickness of the sphere is less than the radius of the sphere.

3. The method of claim 2, wherein the electronics package is a locator device selected from the group consisting of a magnet, an inertial tracker, a data acquisition device, and a sensor for detecting temperature, pressure, and chemical composition of pipeline or well substances.

4. The method of claim 3, wherein said elastomeric material is selected from the group consisting of neoprene, nitrile, and polyurethane.

* * * * *